F. W. CUNARD.
SELF PROPELLED TANK OR REDOUBT FOR MILITARY USE.
APPLICATION FILED AUG. 15, 1919.
1,342,943.
Patented June 8, 1920.
9 SHEETS—SHEET 2.
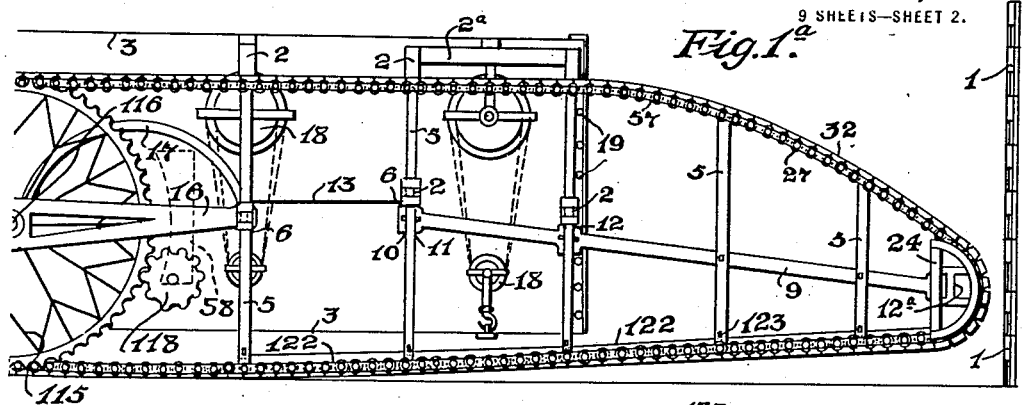
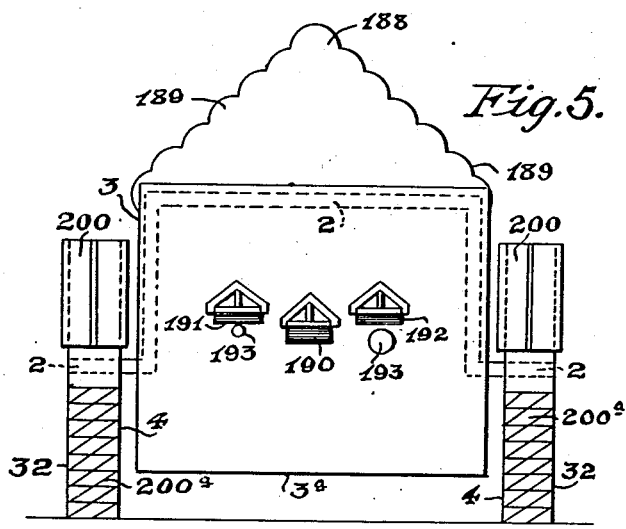
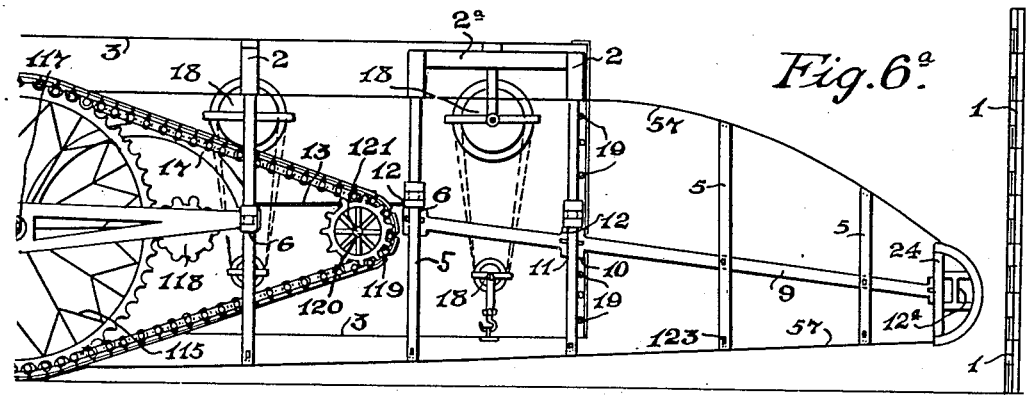

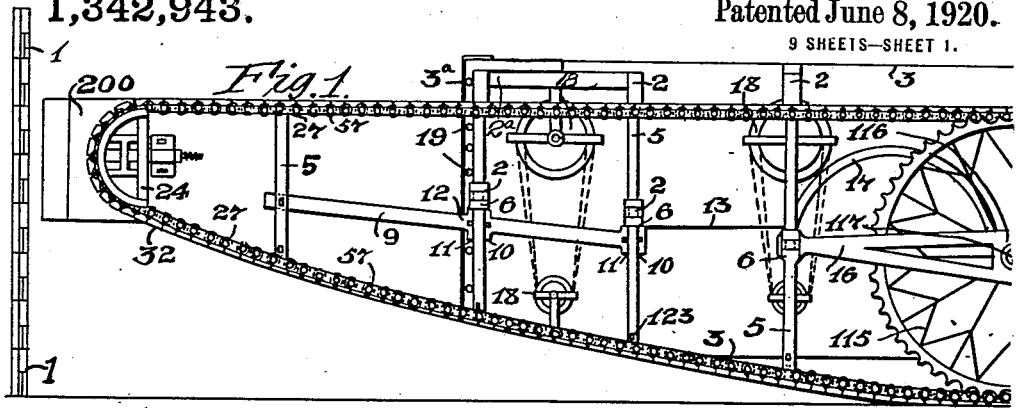
F. W. CUNARD.
SELF PROPELLED TANK OR REDOUBT FOR MILITARY USE.
APPLICATION FILED AUG. 15, 1919.
1,342,943. Patented June 8, 1920.
9 SHEETS—SHEET 1.

F. W. CUNARD.
SELF PROPELLED TANK OR REDOUBT FOR MILITARY USE.
APPLICATION FILED AUG. 15, 1919.

1,342,943.

Patented June 8, 1920.

Witnesses
Leslie Tapley
Edward J. McCormick

Inventor
Frederic William Cunard.

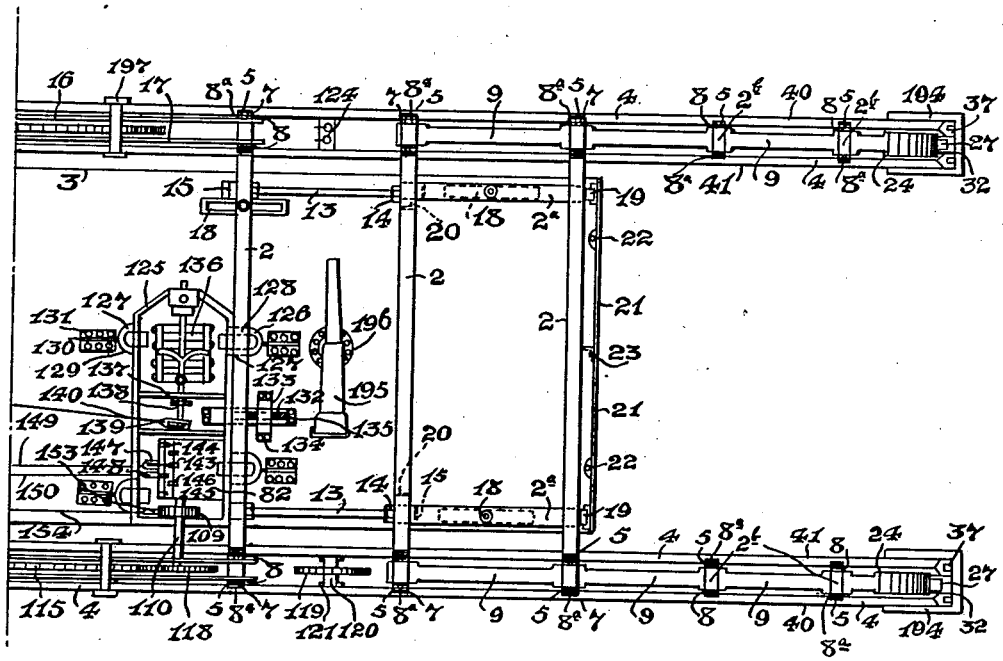
Fig. 7.ª

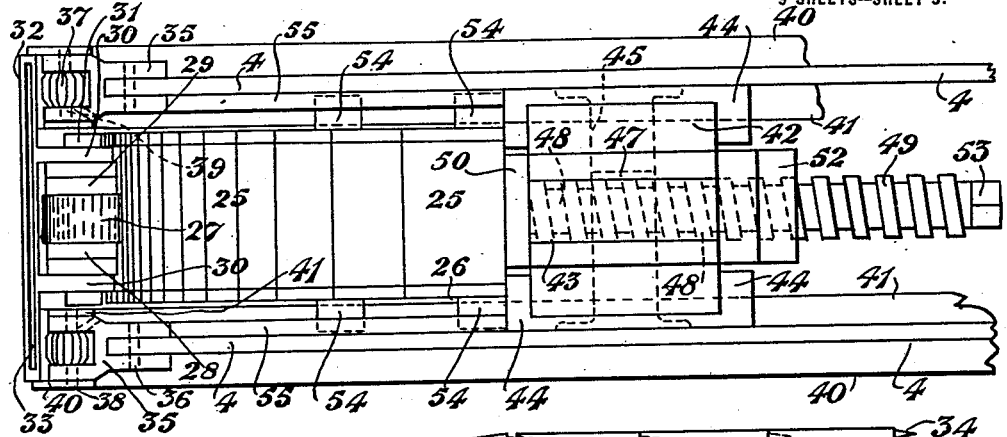
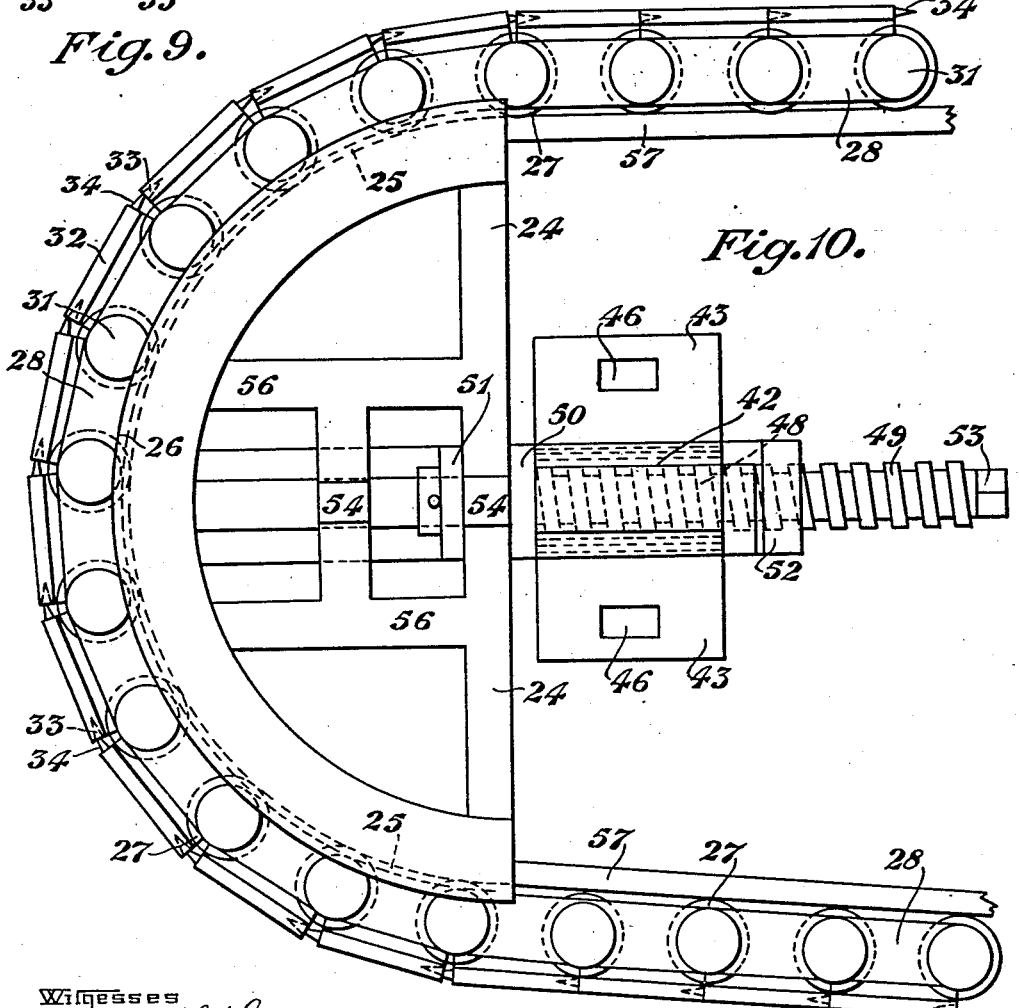

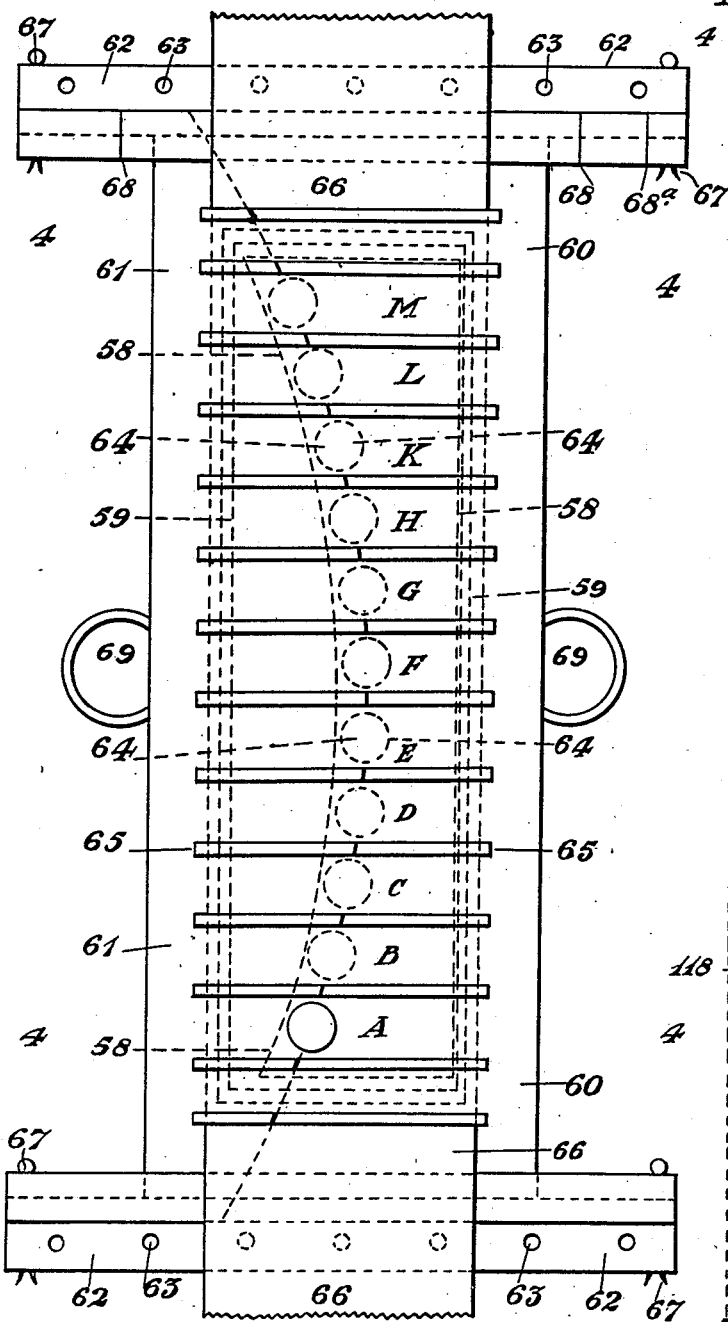
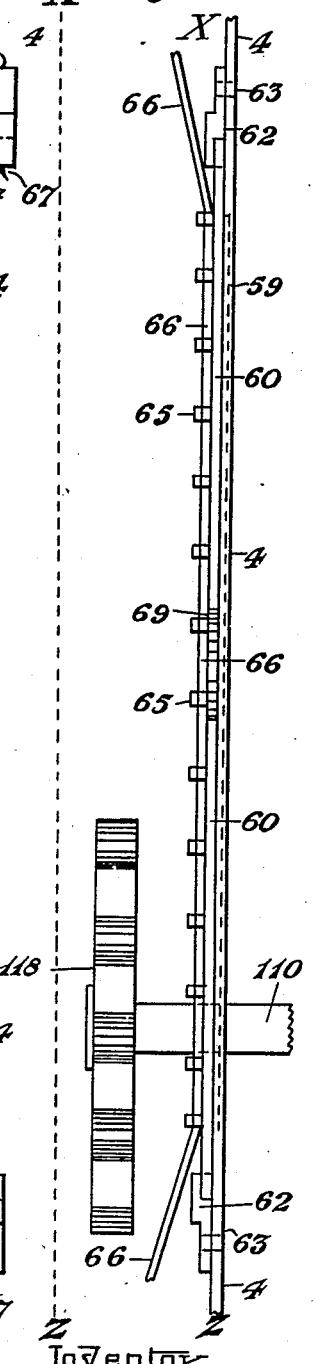

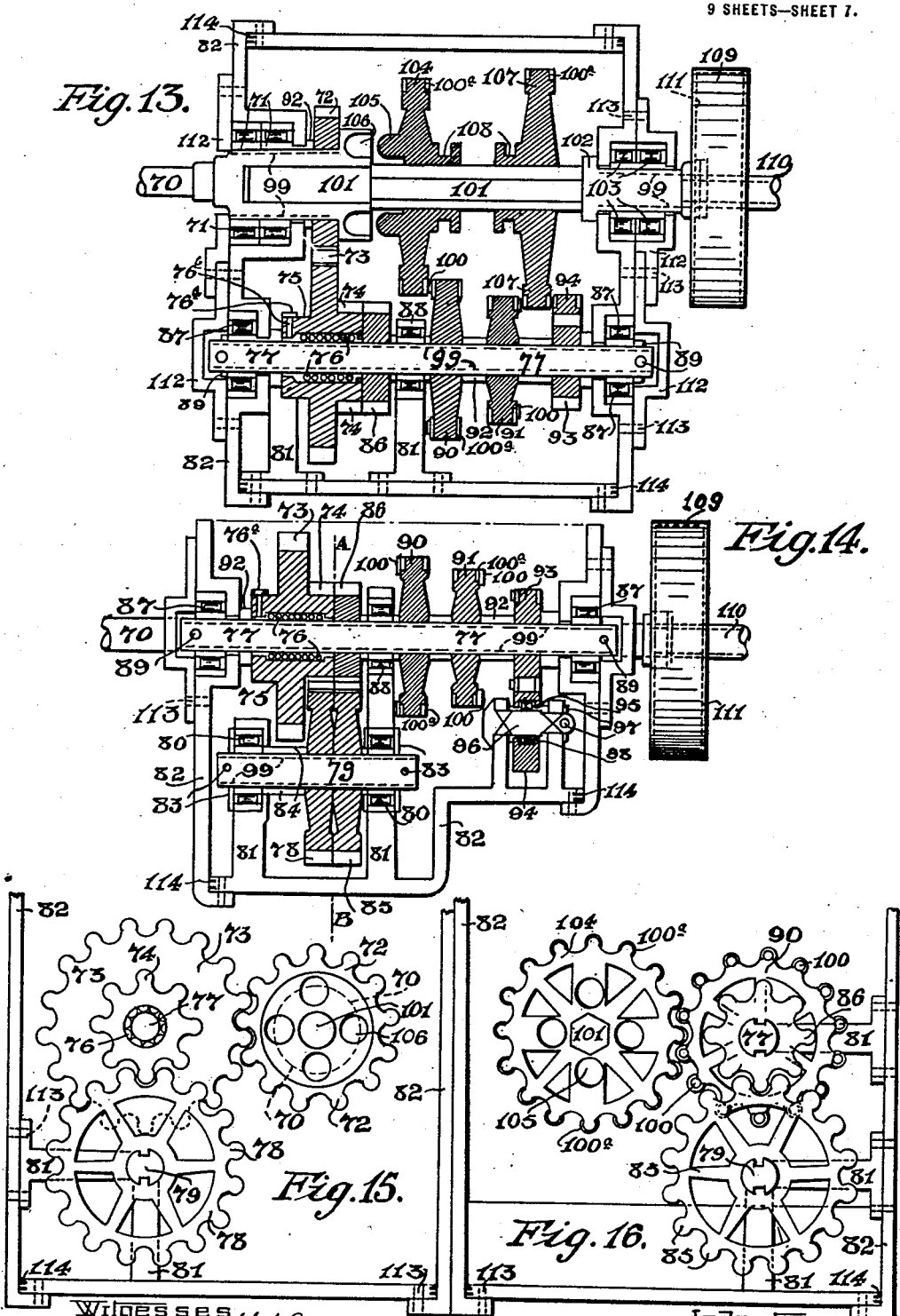

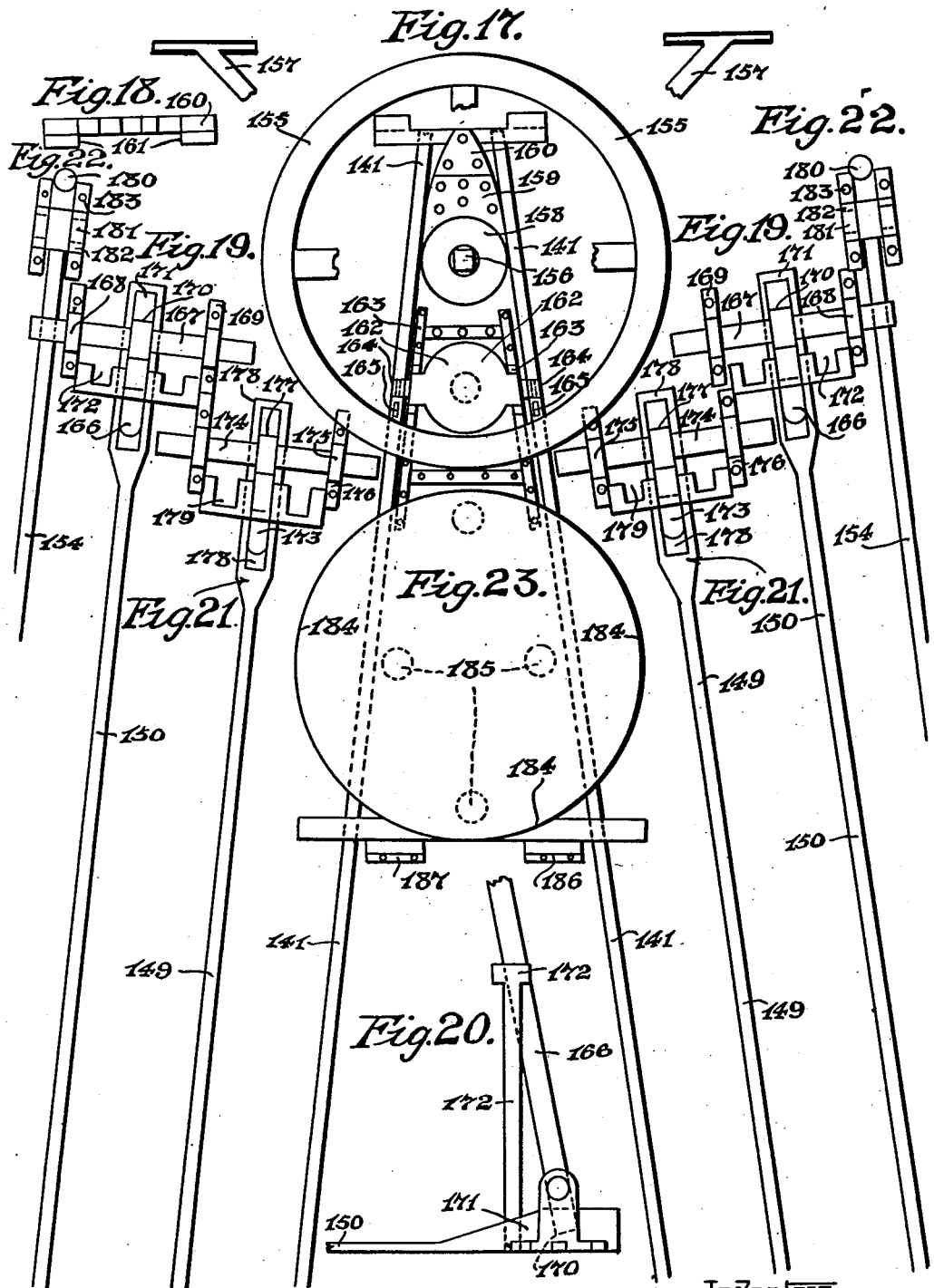

F. W. CUNARD.
SELF PROPELLED TANK OR REDOUBT FOR MILITARY USE.
APPLICATION FILED AUG. 15, 1919.

1,342,943.

Patented June 8, 1920.

Witnesses
Leslie Tapley
Edward J. McCormick

Inventor
Frederic William Cunard.

UNITED STATES PATENT OFFICE.

FREDERIC WILLIAM CUNARD, OF LIVERPOOL, ENGLAND.

SELF-PROPELLED TANK OR REDOUBT FOR MILITARY USE.

1,342,943.           Specification of Letters Patent.     Patented June 8, 1920.

Application filed August 15, 1919. Serial No. 317,840.

*To all whom it may concern:*

Be it known that I, FREDERIC WILLIAM CUNARD, a subject of the King of England, residing at 22 Melville Place, Myrtle and Oxford streets, Liverpool, in the county of Lancaster, England, engineer, have invented certain new and useful Improvements in or Relating to Self-Propelled Tanks or Redoubts for Military Use, of which the following is a specification.

This invention relates to self-propelled "tanks" or redoubts for military use, and has for its main object to provide means whereby a "tank" or redoubt body may be at will raised, in relation to its track or ground level, in order to facilitate or expedite its passage over bog or marsh land, or ground pitted with shell holes; or lowered to reduce its visibility.

A further feature of the invention is that due to one end of the "tank" or redoubt being high and the other end low, and its point of balance being at or near the center, it will climb and move in a facile manner over broken ground and obstructions such as barbed wire entanglements.

Other features or characteristics of the invention are hereinafter described and pointed out in the claiming clauses concluding this specification.

In the accompanying sheets of explanatory drawings:—

Figures 1 and 1ª represent in side elevation a self propelled "tank" or redoubt, the side armor plates being removed to expose the caterpillar-track chains, driving mechanism, and body elevating means.

Fig. 2 is a front view of the "tank" or redoubt, the body being lowered for the purpose of reducing its visibility to enemy artillery.

Fig. 3 is a front view of the "tank" or redoubt, the body being raised to facilitate or expedite its passage over bog or marsh land, or ground pitted with shell holes.

Fig. 4 is a view of a grid adapted to be opened and closed from the inside. Grids of this type are fitted in the roof or top of the "tank" or redoubt and the upper part of the sides, for the purpose of ventilation and admission of light.

Fig. 5 is a front view of the "tank" or redoubt provided with a bomb deflecting roof or top.

Figs. 6 and 6ª represent in side elevation the "tank" or redoubt, the side armor plates and caterpillar-track chains being removed to expose emergency mechanism adapted to propel the structure in the event of loss of one or both of the caterpillar-track chains.

Figure 7:
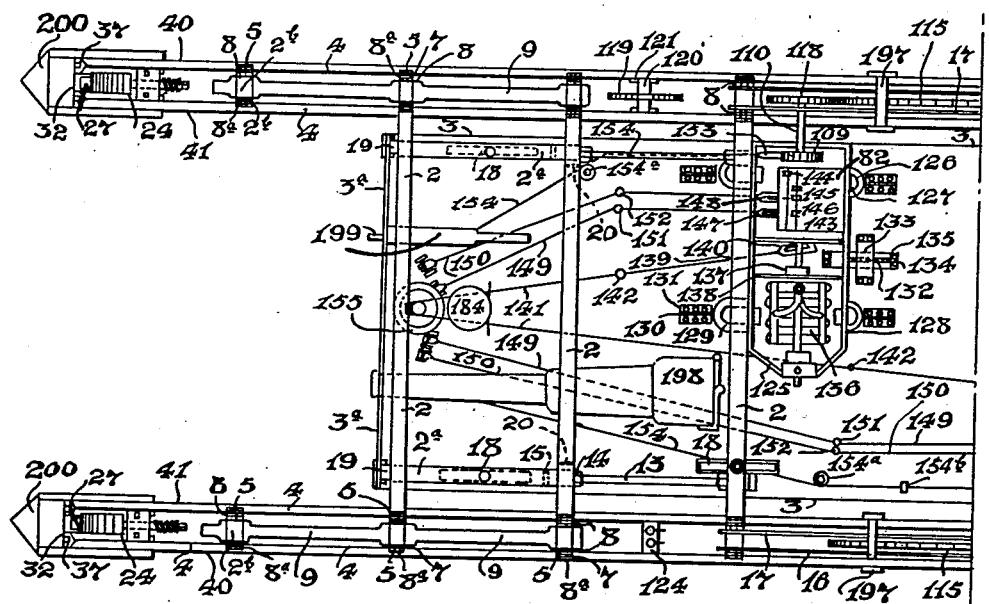

Figs. 7 and 7ª represent in plan view the "tank" or redoubt after the removal of the top or roof and the upper portion of each caterpillar-track chain.

Figure 8:
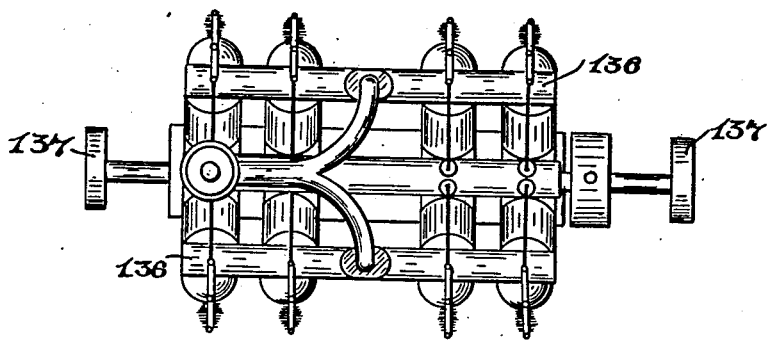

Fig. 8 is a plan view of an internal combustion engine suitable for employment when a single engine only is used to propel the "tank" or redoubt.

Figs. 9 to 23 inclusive are enlarged details:—

Fig. 9 is a plan and Fig. 10 an elevation of the front portion of a caterpillar-track chain, side rollers, water-tight plates and track chain adjusting means.

Fig. 11 is a front view and Fig. 12 is a side view of a water-tight packing slide disposed on a water-tight plate.

Fig. 13 is a plan, and Fig. 14 a side sectional view, of a preferred construction of change speed gearing.

Fig. 15 is a view taken as on line A. B. (left hand side) Fig. 14, and Fig. 16 is a view taken as on line A. B. (right hand side) Fig. 14, of some of the toothed gearing employed in the change speed gear box.

Fig. 17 is a plan view of the steering wheel and parts connected therewith.

Fig. 18 is a front view of an automatic lever carrier.

Figs. 19, 19 is a plan and Fig. 20 a side view of the low speed and reverse hand lever, gate slots, moving bar and lever shoe.

Figs. 21, 21 is a plan of the engine and second speed hand lever, gate slots, moving bar and lever shoe.

Figs. 22, 22 is a plan view of brake actuating hand lever.

Fig. 23 indicates a seat for the operator when steering the "tank" or redoubt.

Figure 24:
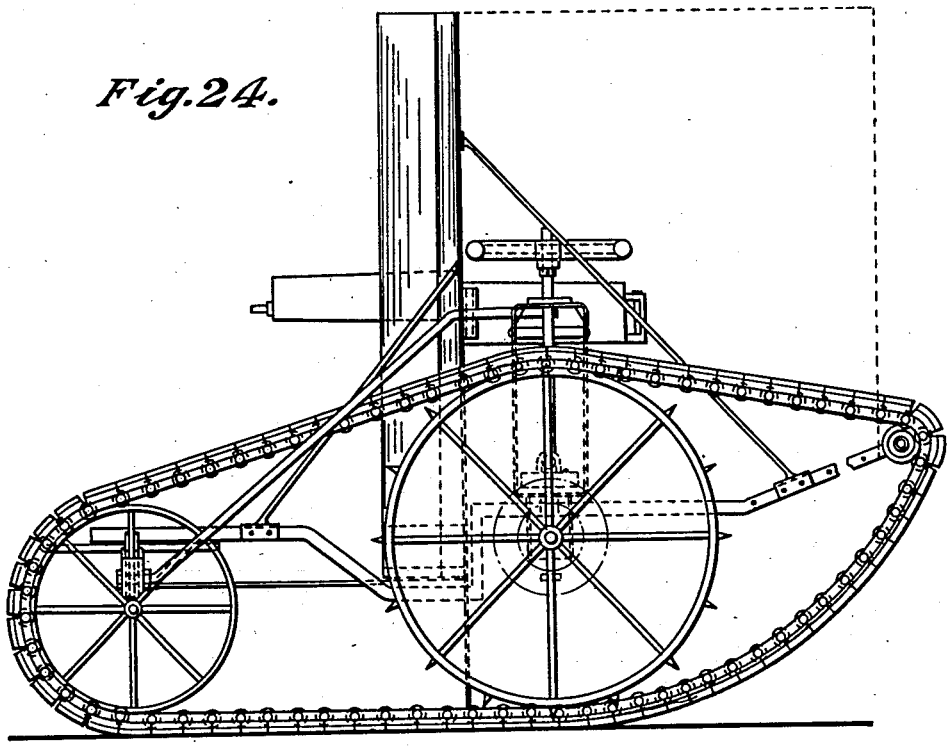

Fig. 24 is a side elevation of the see-saw fashioned track chassis and hand propelled redoubt illustrated in my U. S. A. Patent No. 1,262,926, April 16th, 1918, but provided with a caterpillar-track chain.

Figure 25:
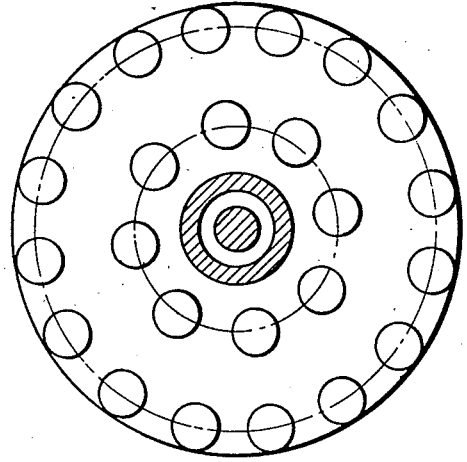
Figure 26:
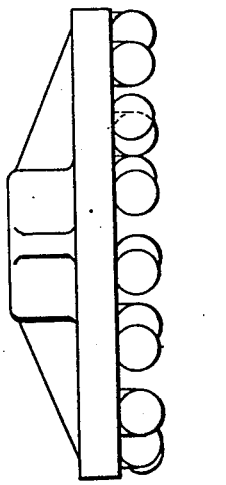

Fig. 25 is a plan and Fig. 26 a side view of a toothed fulcrum wheel.

1. (Figs. 1. 1ª. 6. 6ª.) represent scales which indicate the difference in the turning axis height of the see-saw fashioned track.

2. (Figs. 1. 1ª. 2. 3. 5. 6. 6ª. 7. 7ª.) indicate frame girders, the crank-like portions whereof (Figs. 2. 3. 5. dotted lines) extend through the body of the structure 3, and the axles or small ends extend through each side of the see-saw fashioned track and water-tight plates 4.

2ª. (Figs. 1. 1ª. 6. 6ª 7. 7ª.) indicate longitudinally disposed girders which are locked into the upper portions of the crank girders 2.

5 indicate upright frame supports for water-tight plates 4 which are interlocked into the axles or small ends of the girders 2: the upright frame supports 5 are provided on each side with lugs 6, (Figs. 1. 1ª. 6. 6ª.) for supporting said axles of the crank girders 2, which are provided on the upper part with lugs or projections 8 (Figs. 7. 7ª.) and upper and lower flanges 8ª: for the prevention of lateral movement said flanges 8ª are welded on the outside of the upright frame or supports 5: and to prevent vertical displacement the rivets 7 (dotted lines) extend through the lug or projection 8, the upright frame support 5, and the upper flange 8ª, thus securing and making girders 2 and support 5 rigid and firm on the supporting lugs 6 (Figs. 1. 1ª. 6. 6ª). 2ᵇ (Figs. 7. 7ª.) indicate half-hoop upper and lower stays disposed around drawn tubes 9; said stays 2ᵇ are riveted or welded together and interlocked into the upright frame supports 5, the lugs or projections 8 on said stays 2ᵇ abutting against the inside of supports 5, while the flanges 8ª prevent lateral displacement of tubes 9 and stays 2ᵇ, thereby making a rigid and firm double-T frame on each axle or small end of the crank girders 2 and on the stays 2ᵇ: the tubes 9 (Figs. 1. 1ª. 6. 6ª. 7. 7ª.) extend into integral half-hoop flanges 10 (Figs. 1. 1ª. 6. 6ª.) on the under side of the axles or small ends of the crank girders 2.

11 indicate half-hoop lower supports for the tubes 9 which are clamped and bolted to the flanges 10 on the under side of the axles or small ends of the crank girders 2: 12 indicate stop lugs for preventing longitudinal displacement of tubes 9: the back ends of tubes 9 extend over a keyway through a perforation in frame 24. Said frame 24 is securely fastened to the tubes 9 with the stop lugs 12 on one side and with the lock nuts 12ª on the opposite side.

13. (Figs. 1. 1ª. 6. 6ª. 7. 7ª.) indicate tubes disposed in the body of the structure 3, said tubes are interlocked into the upright portion of the crank girders 2 which are prevented from moving laterally by being clamped and bolted down into perforations or bores 14 (Figs. 7. 7ª) on the tubes 13, these perforations 14 and tubes 13 are on one side of the upper portions of crank girders 2 and on the opposite side of the upper portion of girders 2 the tubes 13 are bolted and locked with the nuts 15.

16 and 17 (Figs. 1. 1ª. 6. 6ª. 7. 7ª) indicate supporting frames for the large dome wheel driving the caterpillar-track chain: the supporting frames 16 and 17 are clamped in on one side and bolted on the opposite side to the axles or small ends of the crank girders 2: this completes the rigid skeleton see-saw track frame and body frame.

3. 3. indicate the sides, top and bottom or flooring of the body of the structure which are plates riveted together.

3ª. indicates an anti-tank gun armor front riveted to the sides, top and bottom or flooring 3.

18. (Figs. 1. 1ª. 6. 6ª. 7. 7ª.) indicate differential pulley blocks for raising and lowering the body of the structure 3, said blocks 18 are fastened on the cranks of the girlers 2, the longitudinal girders 2ª, and on the bottom or flooring of the structure 3.

19. indicate rollers fastened to the anti-tank gun armor front 3ª, and the back plates 3.

20. (Figs. 7. 7ª. dotted lines) indicate rollers securely fastened to the sides and bottom or flooring of the structure 3, said rollers 19 and 20 are for eliminating friction and preventing lateral or longitudinal displacement.

When it is desired to raise or lower the body of the structure for the purpose of extricating the "tank" when in difficulties say on bog, shell pitted or very swampy ground, the endless chains passing around the differential pulley blocks 18 are pulled downward so revolving the upper blocks fastened to the crank girders 2, and the longitudinal girders 2ª and revolving and lifting the lower pulley fastened to the bottom or flooring of the body of the structure 3 to any desired height up to its capacity.

21. (Figs. 7. 7ª.) indicate doors provided on the back of the structure 3 which open inward on hinges 22, said doors are secured by means of the handles 23.

In the doors 21 or in any other part of the structure, apertures may be provided for guns, machine guns, flame throwers and latticed apertures for vision.

24. (Fig. 10.) indicates a front semicircular frame in which is formed a smooth grooved channel 25 (Fig. 9.) with side projections 26 (Fig. 10.) for preventing lateral displacement of the caterpillar-track chain when the rollers 27 (which are preferably provided with a casing of rubber or other suitable noiseless material) are moving on and over the smooth grooved channel 25: 28 (Fig. 9.) indicate spindle-links, the spindles whereof extend through perforations on the rollers 27, spindle plates 29 and caterpillar flanges 30, and are riveted or pinned at 31: 32 indicate caterpillar plates with grooved channels and packing 33 on one side, and projections 34 (Fig. 10.) on the opposite side: said projections 34 extend into the grooved channel, and with packing 33 form a double web across each caterpillar plate 32 for preventing ingress of water: the caterpillar flanges 30 are integral with plates 32: 35 (Fig. 9,) indicates a double slotted channeled flange, the slotted channels running parallel with each other, the smaller slotted channel of flange 35 receives the water-tight plates 4 which are riveted at 36 (dotted lines) around the periphery of the track, the larger slotted channel of flange 35 receiving the rollers 37 (which are preferably provided with an outside casing of rubber or other suitable noiseless material) and are held in position by the spindle bolt and nut 38 (dotted lines.)

39 (dotted lines) indicate lubrication passages for the rollers 37: 40 and 41 indicate outside and inside packing strips provided respectively on the spindle bolt head and nut 38 and are for the prevention of ingress of water through the sides of the double slotted channeled flange 35 while the rollers 37 are moving over the caterpillar plates 32: 42 and 43 (Figs. 9. 10.) indicate arms of a stationary support for the caterpillar-track chain adjuster, the center or horizontal arms 42 (Fig. 9) are held in position by engagement in the slots 44 on the water-tight plates 4, and the upper or perpendicular arms 43 (Fig. 10) are held down in position by the cross stays 45 (Fig. 9. dotted lines) which extend through a slot 46 (Fig. 10) on the upper and lower perpendicular arms 43; the cross stays 45 (Fig. 9) are welded on the outside of the plates 4, lugs 47 (dotted lines) preventing lateral displacement of the support and arms 42 and 43; the stationary support carrying the arms 42 and 43 has an internal screw-thread 48 (dotted lines) through the center for the reception of the screw 49, and is fastened to the semi circular frame 24 (Fig. 10) through a round perforation with the lug or flange projection 50 and the collar and pin 51; the screw 49 has also on it lock nuts 52 and a spanner square 53; 54 (Fig. 9. dotted lines) indicate integral slides on the frame 24 which move into the receiving slide slots 55 on the water-tight plates 4: 56 (Fig. 10) are strengthening stays on the semi circular frame 24.

To adjust and tighten the caterpillar-track chain moving on and over the grooved channel 25, the lock nuts 52 are taken down the screw 49 from three to six inches, a spanner is placed on the square 53 and turned thereby moving screw 49 and pressing and turning the lug or projection 50 on the frame 24, so projecting the slides 54, the semi circular frame 24 and the rollers 27 of the caterpillar-track chain.

The rollers 37 have a clearance from the caterpillar plates 32 when the caterpillar-track chain is turning on the front and back semi circular frames 24: 57 indicate upper and lower see-saw fashioned supports fastened to the upright frame supports 5 for the rollers 27 to move on, which may be used instead of the rollers 37 situated on the upper portions of the tracks.

58 (Figs. 11 and 12 dotted lines) indicate a piece cut out of the water-tight plate 4, and having around it double grooved channels 59 (dotted lines) for holding packing, which the two half slides 60 and 61 press against while being moved in the upper and lower slide slots 62 for preventing ingress of water: said slide slots 62 are riveted at 63 to the water-tight plate 4: each half slide 60 and 61, right and left hand side respectively, have half shaft bores or perforations 64 (dotted lines) and the half of a packing strip case 65 for holding tightly a large packing strip 66 with a single shaft bore or perforation: 67 indicate spring pins inserted through the slide slots 60 and 61 for prevention of lateral movement: 68 and 68ᵃ indicate niches on the upper slide slot 62 for the slides 60 and 61 to be moved to when an adjustment in the height of the structure is about to be made: 69 indicate rings to facilitate the moving of the slides 60 and 61 to and from the niches 68 and 68ᵃ.

A. B. C. D. et cetera denote the different heights to which the body of the structure 3 may be moved, and correspond with similar markings over perforations for lock pins on the upright portion of the crank girders 2 in the body of the structure 3, and also correspond with similar markings and guides on the screw 132 attached to the chassis frame 125 in the body of the structure 3.

To open the water-tight packing slide, the spring pins 67 are withdrawn, and the fingers thrust into the rings 69 on the slides 60 and 61 and moved to the niches 68, 68. This allows the small driving pinion wheel 118 to move up or down on the large driven dome wheel 115 when in mesh; alternatively the right hand side slide 60 may be moved to the niche 68ᵃ, this allows the small driving pinion wheel 118 to be put out of mesh with the large driven dome wheel 115 by turning the screw 132 on the chassis frame 125; this is done before adjusting the height of the body of the structure 3 to the position required; after the adjustment has been made the screw 132 on the chassis frame 125 is turned, putting the small driving pinion wheel 118 into mesh with the large driven dome wheel 115.

70 (Fig. 13) indicates an engine end clutch shaft mounted on roller bearings 71; keyed on said shaft 70 is a driving pinion wheel 72 in constant mesh with a fulcrum pinion wheel 73; said pinion wheel 73 has on its right and left hand side an integral small wheel 74 and bearing 75, respectively, the whole of pinion wheel 73 being mounted on loose ball bearings 76 which are inserted into the channel through a slot 76ª and securely positioned by the shank of the screw bolt 76ᵇ; said fulcrum pinion 73, 74 is mounted loosely on countershaft 77 but turns solidly forward from engine force without making a fulcrum, the fulcrum can only be made one way, that is when the wheel 74 is subjected to excessive load pressure, then the pinion wheel 73, 74 forms a fulcrum on the countershaft 77; the wheel 74 integral with pinion 73 is in constant mesh with a transmission wheel 78 (Fig. 14); said wheel 78 is keyed on shaft 79, which is mounted on roller bearings 80 set into receptacles 81 in the gear box frame 82; said shaft 79 and roller bearings 80 are securely fastened in with a collar and pin 83; 84 indicate clamping pieces for preventing lateral movement of the transmission wheels 78, 85, the latter being keyed on shaft 79, said transmission wheel 85 is in constant mesh with a small wheel 86 keyed on countershaft 77 which is mounted on roller bearings 87 and roller bearing 88, which latter sustain the pressure of the fulcrum pinion wheel 73, 74 and prevent sagging of the countershaft 77, said shaft 77 and roller bearings 87 are securely positioned by means of collars and pins 89; 90 indicates the second-speed wheel keyed on the countershaft 77; 91 indicates the low-speed wheel also keyed on countershaft 77; 92 indicate clamping pieces for preventing lateral displacement of the gearing; 93 indicates a reverse speed transmission wheel keyed on countershaft 77 and in constant mesh with a reverse speed wheel 94, which is mounted on roller bearings 95 and spindle 96 and is securely positioned by collar and pin 97 and clamping pieces 98; 99 (dotted lines) indicate keyways in shafts 70, 77, 79 and 101; 100 indicate rubber stops or other like material which insures noiseless meshing of the gears; clashing and grinding of the gear wheels are obviated by the two wheels having to contact with cushion stops before entering into mesh; 100ª indicate beveled edges on each tooth to facilitate the insertion of one wheel into the other; 101 (Fig. 13) indicates a castellated shaft having one end constantly in the receptacle on the clutch shaft 70, and moving freely in either direction, said shaft 101 is securely positioned by means of the flange or stop lug 102 and is mounted on a double roller bearing 103; 104 indicates a meshing wheel mounted on shaft 101, and adapted to move freely thereon; said wheel 104 possesses rounded clutch teeth 105 for moving into similar receptacles 106 on the clutch shaft 70 to effect a through drive from the engine; said wheel 104 also meshes with wheel 90 for second-speed; 107 indicates a meshing wheel mounted on shaft 101 and adapted to move freely thereon; said wheel 107 meshes with wheel 91 for the low-speed and wheel 94 for the reverse speed, said wheels 104 and 107 have grooved projections 108 for carrying a gear moving fork 146; 109 indicates a brake drum mounted on the propelling shaft 110; 111 (dotted lines) indicate brake shoes; 112 indicate double grooved caps for preventing escapement of oil; 113 (dotted lines) indicate rivets; 114 indicate double grooves on the sides and bottom of the gear box 82 for preventing loss of oil.

When motion is conveyed to clutch shaft 70 it turns the driving pinion wheel 72, the fulcrum pinion wheels 73 and 74, transmission wheel 78, transmission wheel 85, small wheel 86, and the countershaft 77. When motion is desired for the castellated shaft 101 and the propelling shaft 110, the meshing wheel 104 or 107 is moved by the fork 146 in the grooved projection 108 and meshed with any of the desired speed wheels. On heavy loads being carried or steep gradients encountered beyond the normal capacity of the engine to propel the "tank" or redoubt, said fulcrum pinion 73—74 on the countershaft 77 automatically forms a fulcrum on shaft 77 when the excessive load drags or tries to stop the revolving of the gear wheels at wheel 74.

Referring now to the large dome wheel 115, the driving pinion wheel 118 and the frame supports 16, 17 (Figs. 1. 1ª. 6. 6ª. 7. 7ª) 115 indicate large dome wheels in the see-saw fashioned track for propelling the caterpiller-track chain from a double drive, the dome teeth of wheel 115 (Figs. 1. 1ª) meshing with the rollers 27 at the top and bottom of said wheel 115; the double drive is to facilitate the caterpiller-track chains movement and to lessen the strain and likelihood of breaking; 116 indicate a double set of large ball bearings in the receptacles on the frame supports 16 and 17, on which the shaft 117 of the dome wheel 115 is mounted; 118 indicates a roller tooth driving pinion wheel, keyed and securely fastened to the propelling shaft 110 (Figs. 7. 7ª) and in mesh with the large dome wheel 115 (Figs. 1. 1ª. 6. 6ª. 7. 7ª).

119 (Fig. 6ª) indicates a sprocket wheel; 120 indicates ball bearings securely fastened into receptacles on the inner sides of the water-tight plates 4 (Figs. 7. 7ª) on which the shaft 121 of the sprocket wheel 119 is mounted; said shaft 121 is put into position over a keyway on the inner rotating collar of the ball bearing 120.

The sprocket wheel 119 (Fig. 6ª) is employed with a small caterpillar-track chain in conjunction with the large dome wheel 115 when an emergency arises, such as breakage, damage or loss from enemy artillery fire of one or both large caterpillar-track chains around the perimeter of the see-saw fashioned track; the sprocket wheel 119, the large dome wheel 115 and the small caterpillar-track chain will insure the transit of the "tank" or redoubt to safety and prevent the structure becoming a derelict; 122 (Fig. 1ª) indicates an extra bottom bearing if required in the center of the see-saw fashioned track for the rollers 27 to move on; said rollers move on the under side of bearing 122 in conjunction with the rollers 37 (Fig. 9) over which the caterpillar plates 32 travel.

123 (Figs. 1. 1ª. 6. 6ª) indicate bottom strengthening cross stays which are securely fastened through the upright frame supports 5 and welded on the outside of same; 124 (Figs. 7. 7ª) indicate automatic oil drips for lubricating the rollers 27 as each roller and bearing passes.

125 (Figs. 7. 7ª) indicates a chassis frame with flange wheels 126, which move on the rails 127 to adjust and take out of mesh the driving pinion wheel 118 when an adjustment in the height is made; said rails 127 are firmly fastened to the flooring plate 3 with rivets 128; said chassis frame 125 has holding down rods 129 which enter the sliding slots 130, the latter are securely fastened by the rivets 131 to the flooring plate 3; rods 129 preventing an upper movement of the chassis frame 125 when jolted, and the flange wheels 126 preventing lateral movement; 132 indicates a lettered screw with niches for guides punched on it, to indicate the different heights and adjustments of the driving pinion wheel 118; said screw 132 is fastened to the chassis frame 125 and moves through an internal screw thread on a stationary stand 133, which is securely fastened to the flooring plate 3 by rivets 134; 135 indicates a spanner square.

When an adjustment in the height of the body of the structure 3 is to be made, screw 132 is turned by a spanner at 135 either before or when the adjustment is in progress; the chassis frame 125 with the flange wheels 126 moves to the desired adjustment by turning the screw 132; 136 indicate two eight cylinder internal combustion engines, one in each chassis frame 125, for propelling the "tank" or redoubt and have on each crank shaft of the motor of 136 clutch drums 137 for the insertion of clutches 138 fastened on the clutch shafts 70 (Fig. 13) said clutch 138 has an actuating lever 139 with one end engaging in a lever shoe 140 which is integral with a long floor lever 141 turning on a pivot 142 on the flooring plate 3; 143 indicate selector bars moving in the square slides 144 which are securely fastened with rivets or bolts 145 to the half top cover of the gear box 82; each selector bar 143 has securely fastened on it a lever and gear moving fork 146, the latter extending through a slot cut out of the half top cover on the gear box 82 and engaging in the grooved projections 108 (Fig. 13) on the meshing wheels 104 and 107 (Fig. 13); levers of 146 (Figs. 7. 7ª) engaging in the lever shoes 147 and 148, said lever shoes 147 and 148 are integral with long floor levers 149 and 150 turning on the pivots 151 and 152 respectively on the flooring plate 3; 153 indicates a lever shoe for actuating the cam in the brake shoes 111 (Figs. 13. 14. dotted lines) on the inside of the brake drum 109 (Figs. 13. 14) said lever shoe 153 (Figs. 7. 7ª) is integral with a long floor lever and chain 154 turning on the wheel 154ª which is fastened to the flooring plate 3; 154ᵇ indicate holding down pieces fastened to the flooring plate 3. (the whole of the steering and lever mechanism on the floor may be covered over with a thin lugged plate for walking on.)

155 (Fig. 17) indicates a steering wheel (shown broken) and 156 is the column which are securely fastened through a slot on the under side of the flooring plate 3 by a collar and pin, the column 156 is secured to and moves freely in the arms (shown broken) of the brackets 157 fastened to the anti-tank gun armor front 3ª (Fig. 7) thereby making the steering wheel 155 (Fig. 17) and the column 156 firm in its position, the column 156 has on the floor end an integral flange 158 bearing and turning on the flooring or bottom plate 3; riveted to the flange 158 is a cam 159 which has riveted to it an automatic lever carrier 160 with under lugs 161 (Fig. 18) for automatically carrying each floor lever 141 (Fig. 17) back into position; 162 indicates a spring foot pedal with arms moving in the slots of the supports 163, the slotted support is securely fastened to the flooring plate 3; said arms of the spring foot pedal 162 carry movable or swinging levers with floor rollers and slotted portions 164 attached, said slotted portions of 164 are for the reception of lugs 165 integral with the long floor levers 141 (Figs. 7. 7ª) which actuate the clutches 138 (Figs. 7. 7ª.)

When the foot is placed on the spring foot pedal 162 (Fig. 17) and pressed down it actuates the arms carrying the movable or swinging levers of 164, which the rollers of 164 press outward the long floor levers 141 and take out of the clutch drums 137 the clutches 138 (Figs. 7. 7ª). When the foot pressure is relaxed on the spring foot pedal 162 (Fig. 17) the lugs 165 having moved into the slotted portions of 164, automatically carry the long floor levers 141 back into position, and thereby help the clutch spring of the clutch 138 (Figs. 7. 7ª) to move into and grip firmly the clutch drum 137 (Figs. 7, 7ª) to take up the engine drive.

166 (Figs. 19. 19) indicate hand levers for working the low speed and reverse gears; said hand levers are securely fastened on the bars 167 moving in round slots 168, the latter are fastened to the flooring plate 3 with the rivets 169; said hand levers 166 have each a small under arm 170 (Fig. 20. dotted lines) which moves and carries the lever shoe 171, said lever shoes 171 (Figs. 19. 19) are integral with the long floor levers 150 (Figs. 7. 7ª).

172 (Figs. 19. 19. 20) indicate gate slots which the hand levers 166 are laid into for neutral, low speed and reverse, the said gate slots 172 holding the hand levers 166, the long floor levers 150 (Figs. 7. 7ª) and the meshing wheels 107 (Fig. 13) in the gear box 82 rigid and firm.

173 (Figs. 21. 21) indicate hand levers for meshing the engine and second speeds, said levers 173 are securely fastened on the bars 174 moving in the round slots 175, the latter are fastened to the flooring plate 3 with the rivets 176; hand levers 173 have each a small under arm 177 which moves and carries the lever shoe 178, said lever shoes 178 (Figs. 21. 21) are integral with the long floor levers 149 (Figs. 7. 7ª).

179 (Figs. 21. 21) indicate gate slots which the hand levers 173 are laid into for neutral, engine and second speeds, the said gate slots 179 holding the hand levers 173, the long floor levers 149 (Figs. 7. 7ª) and the meshing wheels 104 (Fig. 13) in the gear box 82 rigid and firm.

When it is desired to actuate the hand levers 166 and 173, and change into different gate slots, said hand levers are brought to a perpendicular position, then slid over the bars to the desired slot and lowered into it.

180 (Figs. 22. 22) indicate hand levers for actuating the brake shoes 111 (Figs. 13. 14. dotted lines) in the brake drum 109 which is fastened on the propelling shaft 110 (Figs. 13. 14) hand levers 180 (Figs. 22. 22) are fastened on bars 181 moving in round slotted pieces 182, which are fastened to the flooring plate 3 by rivets 183, said hand levers 180 have each a small under arm attached to the floor levers 154 (Figs. 7. 7ª).

To actuate the hand levers 180 (Figs. 22. 22) to put the brake on and to stop the machinery, said levers 180 are taken from the reclining position forward and pulled back, this movement turns the cam actuating the brake shoes 111 (Figs. 13. 14. dotted lines) said brake shoes 111 pressing against the inside of the brake drum 109 stops the propelling shaft 110 and caterpillar-track chain.

184 (Fig. 23) indicates a chair for the operator of the steering wheel, speeds and brakes, said chair 184 is put into tubes 185 (dotted lines) and securely fastened to the flooring plate 3; 186 indicate engine starting buttons; 187 indicate lighting and air fan buttons.

Before starting the engines 136 (Figs. 7. 7ª) the steering operator opens the latticed vision bars 190 and seeing that the hand levers 166 and 173 (Figs. 19. 19. 21. 21) respectively are in neutral and the brakes off, he then touches the engine starting button 186 (Fig. 23) and when seated on the chair 184 (Fig. 23) the operator puts his foot on the spring foot pedal 162 (Fig. 17) pressing it down and thrusting out the long floor levers 141 and the clutches 138 (Figs. 7. 7ª) out of the clutch drums 137 (Figs. 7. 7ª).

If it is desired to move the "tank" or redoubt forward in a straight line the hand levers 166 (Figs. 19. 19) are placed into the low speed slots of 172, this meshes in the gear boxes 82 the wheels 107 and 91 (Fig. 13) then the operator gradually relaxes the pressure on the spring foot pedal 162 (Fig. 17) bringing in the long floor levers 141 and putting the clutches 138 into the drums 137 (Figs. 7. 7ª) and thereby turning the driving pinion wheel 118 (Figs. 1. 1ª. 7. 7ª) dome wheel 115 and the caterpillar-track chain and "tank" or redoubt forward in a straight line.

When it is desired to turn the "tank" or redoubt to the right the operator turns the steering wheel 155 (Fig. 17) to the right, the cam 159 (Fig. 17) thrusting out the long floor lever 141 and the right hand side clutch 138 (Figs. 7. 7ª) to disconnect the engine from the gear box mechanism and stop the right hand side caterpillar-track chain, this allows the left hand side engine and caterpillar-track chain to turn the "tank" or redoubt to the right or around a small radius; when the operator has turned to the right sufficiently or around, the steering wheel 155 (Fig. 17) is gradually turned to its former position (neutral) and by so doing the right hand side clutch 138 (Figs. 7. 7ª) is put into the clutch drum 137 (Figs. 7. 7ª) so connecting up the drive of the engine with the gear box mechanism to cause the caterpillar-track chain and "tank" or redoubt to move forward in a straight line.

When it is desired to turn to the left the same manipulation is carried out as in the preceding description, but reversing the manipulation of the gears, the steering wheel 155 (Fig. 17) is turned to the left, the cam 159 (Fig. 17) thrusting out the long floor lever 141 and the left hand side clutch 138 (Figs. 7. 7ª) to disconnect the engine from the gear box mechanism and stop the left hand side caterpillar-track chain, this allows the right hand side engine and caterpillar-track chain to turn the "tank" or redoubt to the left or around a small radius. When the operator has turned to the left sufficiently or around, the steering wheel 155 (Fig. 17) is gradually turned to its former position (neutral) and by so doing the left hand side clutch 138 (Figs. 7. 7ᵃ) is put into the clutch drum 137 (Figs. 7. 7ᵃ) so connecting up the drive of the engine with the gear box mechanism to cause the caterpillar-track chain and "tank" or redoubt to move forward in a straight line; alternatively the operator may steer the "tank" or redoubt to the right or the left by gearing the right or the left hand side into a higher speed while running on the low speed, for example, if the operator desires to turn to the right he will turn the steering wheel 155 (Fig. 17) and take the left hand side clutch 138 out of 137, (Figs. 7. 7ᵃ) then he will take the left hand side hand lever 166 (Fig. 19) lift it out of the low speed gate slot and slide it into the neutral slot of 172. He will then take the left hand side hand lever 173 (Fig. 21) and slide it into the second or engine speed gate slot of 179; then the operator turns the steering wheel 155 (Fig. 17) to its former position (neutral) which puts the clutch 138 into the clutch drum 137, (Figs. 7. 7ᵃ) this will cause the caterpillar-track chain on the left hand side to turn much faster, and the "tank" or redoubt will turn to the right without stopping.

The reverse gear may be used when traveling down hills or steep grades if the non-slipping slots on the caterpillar plates 200ᵃ are not gripping the ground sufficiently and the "tank" or redoubt is gaining momentum and becoming out of control, through the caterpillar plates slipping over the ground. To reverse, the foot is pressed down on the spring foot pedal 162, (Fig. 17) thrusting out both clutches 138, (Figs. 7. 7ᵃ) the hand levers 166 (Figs. 19. 19) are placed into the reverse slots of 172 to mesh the wheels 107 and 94 in the gear boxes 82, (Fig. 13) then the foot is taken off the spring foot pedal 162 (Fig. 17) putting both clutches 138 into the clutch drums 137, (Figs. 7. 7ᵃ) this will cause the reversing of the caterpillar-track chains at each side.

188 (Fig. 5) indicates a half circle tube and 189 quarter circle tubes welded or bolted lengthwise together, this is placed on the roof of the redoubt and securely fastened to the front, back and side plates 3ᵃ and 3 respectively, the quarter circles 189 are for baffling the enemy's air-craft bombs by deflecting same, such deflection causing the point contact bombs to fall to the ground without explosion. The half circle tube 188 has squares cut out of it for the reception of grids (Fig. 4) which have on the inside for the admission of air and light sliding portions adapted to open and close, formed of thick translucent glass, metal and a space, said grids (Fig. 4) are placed on the top or roof and upper portions of the sides and back in the body of the structure 3; said half circle tube 188 (Fig. 5) has a loop hole and latticed vision bars cut in it for the anti air-craft gun 195.

190 (Figs. 2. 5) indicates latticed vision bars shaded to open and close on the inside for the steering operator; 191 and 192 indicates latticed vision bars shaded to open and close on the inside for the gunners; 193 indicates loop holes for guns.

194 (Fig. 7ᵃ) indicate mud scrapers; 195 indicate an anti air-craft gun revolving on a cylinder or turret 196 and riveted to the flooring plate 3; 197 (Figs. 7. 7ᵃ) indicate rollers moving in receptacles for preventing the caterpillar track chains on the large dome wheels 115 from moving up, the receptacles containing the rollers 197 are securely fastened to the water-tight plates 4; 198 (Fig. 7) indicates a quick firing gun and 199 a machine gun.

200 (Figs. 1. 2. 3. 5. 6. 7) indicates anti tank gun deflectors securely fastened to the water-tight plates 4 to deflect and prevent anti tank gun fire from destroying the caterpillar-track chains while turning on the smooth grooved channel 25 (Fig. 9) of the semi circle frame 24 (Figs. 9. 10)

200ᵃ (Figs. 1. 2. 3. 5. 6. 7) indicate non slipping slots cut out of the caterpillar plates 32 (Figs. 9. 10).

136 (Fig. 8) indicates an internal combustion engine and 137 clutch drums.

Figs. 24. 25. 26 indicate the patent hand propelled redoubt, which has been previously referred to.

In some cases said "tank" or redoubt may be propelled by electric motor and elevator systems other than by hand employed.

Having now described my invention or improvements, what I claim as new and desire to secure by Letters Patent is:—

1. The combination in a "tank" or redoubt for military use, of crank girders; an elevator system supported by said cranks for raising and lowering the body of the structure; axles on each crank girder; water-tight caterpillar plates and water-tight plates and chassis constructed as a see-saw fashioned track supported by said crank girders; a roof for baffling and deflecting aircraft bombs; means designed to deflect frontal gun fire; grids adapted to open and close provided in the body of the structure; a small emergency caterpillar-track chain on each side of the see-saw fashioned track; and means adapted to actuate said emergency caterpillar-track chains.

2. The combination in a "tank" or redoubt for military use, of crank girders; an elevator system supported by said cranks for raising and lowering the body of the structure; axles on each crank girder; water-tight caterpillar plates and water-tight plates and chassis constructed as a see-saw fashioned track; supported by said crank girders; a roof for baffling and deflecting aircraft bombs; means designed to deflect frontal gun fire; grids adapted to open and close provided in the body of the structure; a small emergency caterpillar-track chain on each side of the see-saw fashioned track; and means adapted to actuate said emergency caterpillar-track chains; a self propelled engine, double clutch drums on the crank shaft of said engine and in the gear boxes thereof; a fulcrum pinion wheel; and toothed wheel transmission mechanism; gear with stops of noiseless material; steering mechanism; and material for preventing clanging and clashing noises in the machinery.

In witness whereof I have hereunto set my hand this 17th day of July, 1919.

FREDERIC WILLIAM CUNARD.

Witnesses:
LESLIE TAPLEY,
EDWARD J. McCORMICK.